(12) United States Patent
Romano

(10) Patent No.: US 9,388,923 B2
(45) Date of Patent: Jul. 12, 2016

(54) HOSE ASSEMBLY WITH ANTI-ROTATIONAL COUPLING AND CRIMPING SECTION

(75) Inventor: Jean-Pierre Romano, Le Cheylas (FR)

(73) Assignee: Caterpillar Inc., Peoria, IL (US)

( * ) Notice: Subject to any disclaimer, the term of this patent is extended or adjusted under 35 U.S.C. 154(b) by 951 days.

(21) Appl. No.: 11/806,435

(22) Filed: May 31, 2007

(65) Prior Publication Data

US 2008/0296893 A1 Dec. 4, 2008

(51) Int. Cl.
| F16L 25/00 | (2006.01) |
| F16L 19/025 | (2006.01) |
| F16L 33/207 | (2006.01) |

(52) U.S. Cl.
CPC ............. *F16L 19/025* (2013.01); *F16L 33/207* (2013.01)

(58) Field of Classification Search
USPC .................. 285/328, 913, 330, 336, 368, 363
See application file for complete search history.

(56) References Cited

U.S. PATENT DOCUMENTS

| | | | |
|---|---|---|---|
| 2,050,137 A * | 8/1936 | Walsh | 285/331 |
| 2,374,226 A | 4/1945 | Melsom | |
| 3,064,998 A | 11/1962 | Syverson | |
| 3,612,578 A * | 10/1971 | Bagnulo | 285/50 |
| 3,623,753 A * | 11/1971 | Henry | 285/330 |
| 3,851,690 A * | 12/1974 | Wing et al. | 411/190 |
| 3,889,982 A * | 6/1975 | Trunnell | 285/5 |
| 3,902,747 A | 9/1975 | Weinhold | |
| 4,022,499 A * | 5/1977 | Holmes et al. | 285/328 |
| 4,099,745 A * | 7/1978 | Cobbs | 285/24 |
| 4,512,596 A * | 4/1985 | Obrecht | 285/81 |
| 4,655,482 A | 4/1987 | Myers et al. | |
| 5,087,504 A * | 2/1992 | Kanai et al. | 428/167 |
| 5,333,915 A | 8/1994 | Sparling et al. | |
| 5,431,507 A * | 7/1995 | Smilanick | 403/307 |
| 5,435,760 A * | 7/1995 | Miklos | 439/321 |
| 5,785,357 A | 7/1998 | Foster et al. | |
| 5,927,762 A * | 7/1999 | Webb | 285/123.15 |
| 6,471,255 B1 * | 10/2002 | Ulrich | 285/354 |
| 6,557,905 B2 * | 5/2003 | Mack et al. | 285/330 |
| 6,666,274 B2 * | 12/2003 | Hughes | 166/385 |
| 7,044,507 B2 | 5/2006 | Ricard | |
| 7,207,605 B2 * | 4/2007 | Olechnowicz et al. | 285/328 |
| 7,226,090 B2 * | 6/2007 | Hughes | 285/330 |
| 7,390,032 B2 * | 6/2008 | Hughes | 285/330 |
| 7,394,021 B2 * | 7/2008 | Magno, Jr. | 174/59 |
| 2001/0038206 A1 | 11/2001 | Olechnowicz et al. | |
| 2004/0238776 A1 | 12/2004 | Peters et al. | |
| 2007/0001457 A1 | 1/2007 | Aas | |
| 2007/0246258 A1 | 10/2007 | Magno | |

FOREIGN PATENT DOCUMENTS

| AU | 1278266 A | 9/1968 |
| EP | 0439328 | 7/1991 |
| GB | 998128 A | 7/1965 |
| JP | 2003105752 A | 4/2003 |

* cited by examiner

*Primary Examiner* — Aaron Dunwoody

(57) ABSTRACT

A flexible hose assembly is disclosed. The flexible hose assembly has a first coupling member with a first anti-rotational element on a first end and a crimping element on a second end, the crimping element being configured to receive a first flexible hose. The flexible hose assembly also has a second coupling member with a second anti-rotational element on a first end, the second anti-rotational element being configured to mate with the first anti-rotational element. The flexible hose assembly also has a clamping ring configured to retain the first ends of the first and the second coupling members together.

18 Claims, 2 Drawing Sheets

HOSE ASSEMBLY WITH ANTI-ROTATIONAL COUPLING AND CRIMPING SECTION

TECHNICAL FIELD

The present disclosure is directed to a hose assembly and, more particularly, to a hose assembly having an anti-rotational coupling attached to a flexible hose via a crimping element.

BACKGROUND

Fluid transfer systems, such as, for example, hydraulic systems, generally include flexible hoses for transfer of pressurized fluid to components of the fluid system, such as pumps, filters, metal pipes, hydraulic cylinders, and fluid reservoirs. The flexible hoses are often connected with the fluid system components by way of a rigid threaded coupling. Specifically, a first threaded coupling member is attached to one flexible hose, while a second threaded coupling member is bolted, welded, threaded, or otherwise joined rigidly to the fluid system component. The first coupling member is then threadingly engaged with the second coupling member, thus creating a sealed assembly through which fluid may be transmitted.

During the operation of the fluid transfer system, vibration, changing pressures, and changing flow rates can create torsional forces that can loosen the sealed assembly. For example, a large pressure (may be up to 250 or 300 bar in some high pressure systems) or flow rate in a curved portion of the flexible hose can create a force that distorts the trajectory of (e.g., straightens) the flexible hose. Fluctuations in the pressure and other vibrations can create movement and/or torsional forces that can loosen the threaded coupling members. As the couplings begin to separate, the transmitted fluid may begin to leak through the threaded interface between the coupling members. The leaking fluid may lubricate the threads on the first and second coupling members and cause even further loosening. The fluid leakage can result in decreased pressure in the system that diminishes the ability of the system to perform useful work or transmit further fluid. The leakage also wastes fluid, and may create a need for periodic fluid replenishing.

One method of preventing relative rotation of coupling members is disclosed in U.S. Pat. No. 6,557,905 (the '905 patent) issued to Mack et al. on May 6, 2003. The '905 patent discloses a submersible well pump assembly having two connected housings, a clamp ring, and an anti-rotation member. To keep the connection between the two housings secure, the anti-rotation member has cooperative elements associated with each end of the two housings to inhibit rotation of one housing relative to the other. Once placed in compression, the cooperative elements have intermeshing teeth that interlock to inhibit rotation of one adapter relative to the other. The teeth have triangular ridges with radial symmetry that are integrally formed on each end face. The clamp ring is used to put the two housings in compression. The clamp ring is rotatably and slidably carried on the first housing and has internal threads that engage external threads of the second housing to draw the housings together upon threading. Each of the first and second housings connect to the next member in the assembly by a threaded, sealed connection made in a conventional manner.

Although the submersible well pump assembly of the '905 patent may prevent rotation of the first and second housings, it may be incompatible with a flexible hose. Specifically, both of the housings in the '905 patent are joined to the next respective member via a threaded joint. Using a conventional threaded joint to connect each coupling member to the flexible hose may create another location where loosening and separation may occur. In other words, although the ends of the housings that incorporate the anti-rotational member may not loosen relative to each other, the housings may loosen relative to the next respective members. As described above, this loosening may cause leakage and loss of pressure.

The disclosed hose assembly is directed to overcoming one or more of the problems set forth above.

SUMMARY OF THE DISCLOSURE

In one aspect, the present disclosure is directed to a flexible hose assembly. The flexible hose assembly may include a first coupling member having a first anti-rotational element on a first end, and a crimping element on a second end. The crimping element may be configured to receive a first flexible hose. The flexible hose assembly may further include a second coupling member having a second anti-rotational element on a first end. The second anti-rotational element may be configured to mate with the first anti-rotational element. A clamping ring may retain the first ends of the first and the second coupling members together.

In yet another aspect, the present disclosure is directed to a method of connecting a flexible hose assembly. The method may include mating a first coupling member and a second coupling member to inhibit relative rotation. The method may further include holding the first and second coupling members together with a clamping ring to control axial displacement between the first and second coupling members. The method may also include connecting one of the first and second coupling members to a flexible hose.

DETAILED DESCRIPTION

Figure 1:
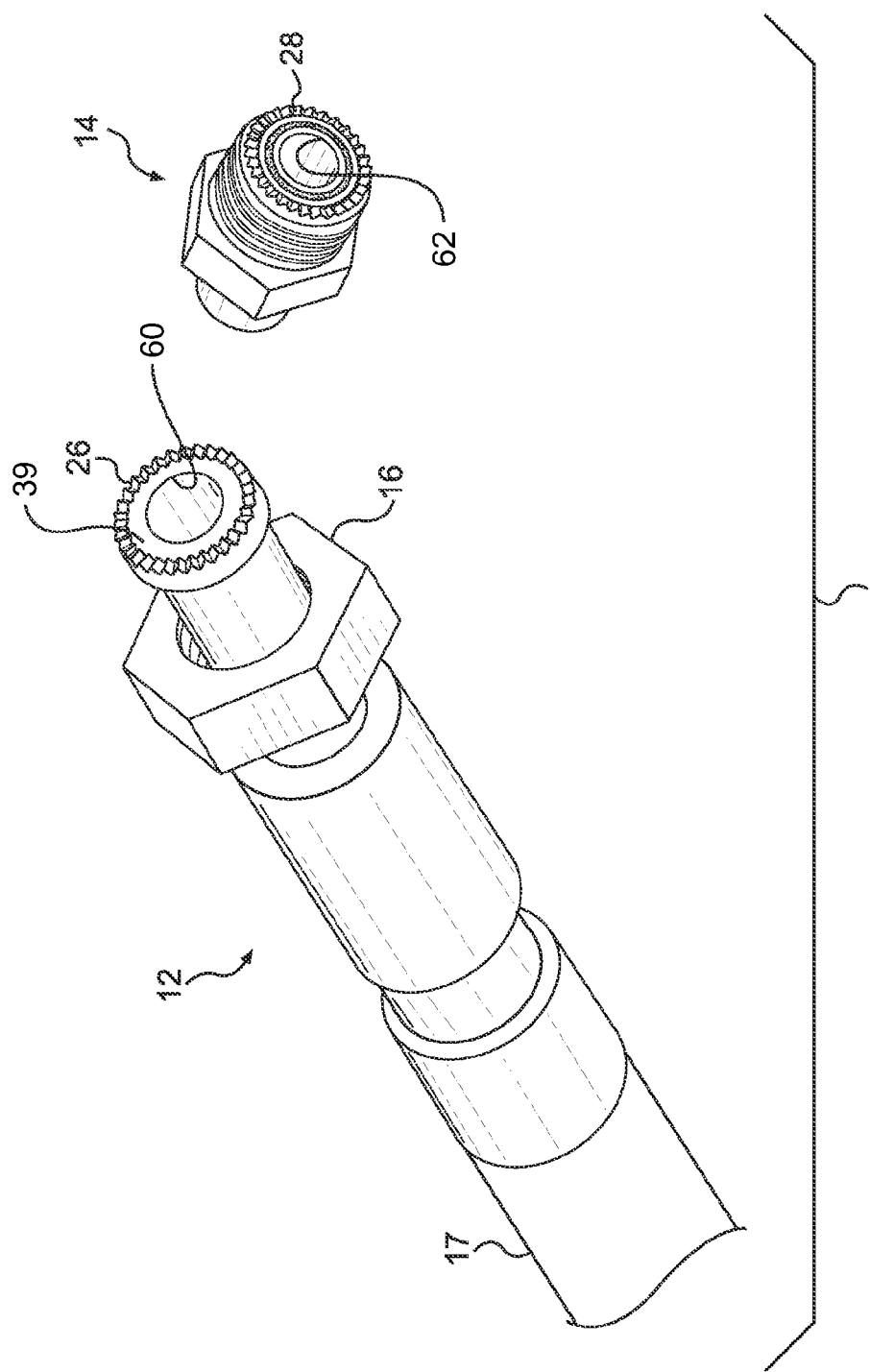
FIG. 1 is a pictorial illustration of an exemplary disclosed hose assembly.

FIG. 1 illustrates a hose assembly 10 for transmission of pressurized fluid. Hose assembly 10 may include a flexible hose 17, a first coupling element 12, a second coupling member 14, and a clamping ring 16. Hose assembly 10 may transmit any fluid, such as, for example, a fuel, a coolant, an oil, a cleaning fluid, air, or any other fluid known in the art.

Flexible hose 17 may be a hollow member used to conduct fluid. Flexible hose 17 may be fabricated from rubber, plastic, or any other flexible material, and may have any combination of layers of these materials. An outer wall of flexible hose 17 may be reinforced with a braided or meshed metal and/or a composite material to improve the strength of flexible hose 17.

Figure 2:
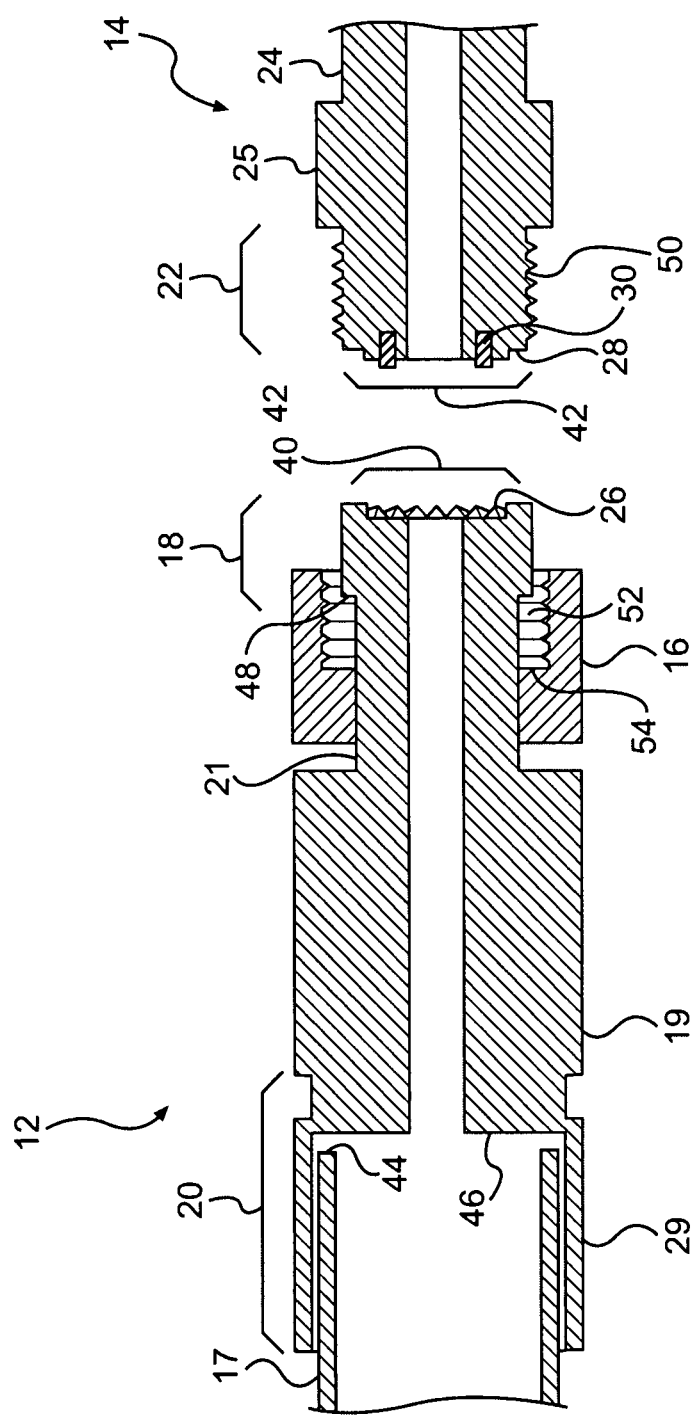
FIG. 2 is a cross-sectional illustration of the hose assembly of FIG. 1.

As shown in FIG. 2, first coupling member 12 may be a generally hollow member with a fluid orifice 60 that provides a means for mechanically and fluidically interfacing flexible hose 17 with second coupling member 14 and, thus, with an associated fluid system component (e.g., a pump, a valve, a pipe, etc.). In particular, first coupling member 12 may include a first end 18, a neck 21, a body 19, and a second end 20. First coupling member 12 may be fabricated from steel, aluminum, brass, plastic, composite, or any other material known in the art.

First end 18 may include a first anti-rotational element 26 to prevent rotation of first coupling member 12 relative to second coupling member 14, once joined. In one embodiment, first anti-rotational element 26 may be a modification of the surface topography of a face 40. For example, first anti-rotational element 26 may embody annularly located triangular or rectangular ridges or teeth on face 40 having a radial symmetry. First anti-rotational element 26 may be machined, injection molded, cast or otherwise formed in first end 18 of first coupling member 12.

Neck 21 may be an area of reduced diameter located between first end 18 and body 19 of first coupling member 12. Neck 21 may have varying lengths and may have a linear or an angled trajectory (e.g., 45 or 90 degree angle). Clamping ring 16 may be slidably disposed on neck 21.

Second end 20 of first coupling member 12 may include a crimping element 29 that mechanically interfaces with flexible hose 17. Crimping element 29 may receive flexible hose 17 such that a terminal end 44 of flexible hose 17 abuts an internal shoulder 46 of first coupling member 12 (not shown as abutting in FIG. 2). Prior to crimping, an outer diameter of flexible hose 17 may be slightly smaller than the initial interior diameter of crimping element 29. Second end 20 may be constructed of a thin (i.e., thinner than the walls of body 19) deformable material, such as, for example, steel, copper, aluminum, or plastic. A constricting force may apply to crimping element 29 to reduce its diameter such that an interior surface of crimping element 29 is brought into contact with and compresses an external surface of flexible hose 17. This reduction in the diameter of crimping element 29 may produce a high coefficient of friction between the outer surface of flexible hose 17 and the inner surface of crimping element 29 and may constrain the axial displacement and rotation of flexible hose 17 relative to second end 20. It is contemplated that crimping element 29 may include internal protrusions that at least partially penetrate flexible hose 17, if desired. It is also contemplated that crimping element 29 may be integral with first coupling member 12, or may be attached to first coupling member 12 via welding, brazing, chemical bonding, mechanical fastening or any other fastening method known in the art.

Second coupling member 14 may be a generally hollow member with a fluid orifice 62 that provides a means for mechanically and fluidly joining first coupling member 12 with the fluid system component. Specifically, second coupling member 14 may include a first end 22, a fixed fastening member 25, and a second end 24. Second coupling member 14 may be fabricated from steel, aluminum, brass, plastic, composite, or any other material used or known in the art.

First end 22 may include a second anti-rotational element 28, a sealing member 30, and an externally threaded portion 50. Second anti-rotational element 28 may be located to interface with first anti-rotational element 26 and constrain the rotation of second coupling member 14 relative to first coupling member 12, once joined. Similar to first anti-rotational element 26, second anti-rotational element 28 may be a modification of the surface topography of a face 42, such as, for example, annularly located triangular ridges of first anti-rotational element 26 (also see FIG. 1). Second anti-rotational element 28 may be machined, injection molded, cast or otherwise formed in first end 22 of second couple member 14.

The radially symmetric ridges of first and second anti-rotational elements 26 and 28 may allow for multiple angular orientations of first coupling member 12 relative to second coupling member 14. It is considered that the ridges may be approximately the same size, and thus the number of angular orientations may be equal to the number of ridges. The number of ridges may be optimized depending on the desired application to have a finer or a courser selection of angular positions for first coupling member 12 relative to second coupling member 14. The number of ridges may also be a function of the mechanical stresses applied to first and second coupling members 12 and 14. For example, in applications where large torsional forces may be applied to first and second coupling members 12 and 14, larger (and thus potentially fewer) ridges may be required to withstand the subsequent stresses.

Sealing member 30 may impede the passage of fluid between the interface of first coupling member 12 and second coupling member 14. Sealing member 30 may embody, for example, a gasket, an o-ring, an adhesive substance, or any other sealing device or method known or used in the art. To seal the coupling member's interface, one end of sealing member 30 may be situated in a groove in face 42 of second coupling member 14, while the opposite end of sealing member 30 may be compressed against a generally planar portion, referred to as a sealing surface 39, of face 40 of first coupling member 12. It is contemplated that a sealing member 30 may additionally or alternatively be located outside of the radially symmetric ridges of second anti-rotational element 28, if desired.

Fixed fastening member 25 may be interposed between first end 22 and second end 24 of second coupling member 14 and may be integral with second coupling member 14. Fixed fastening member 25 may have a plurality of planar surfaces upon which a tightening mechanism (e.g., a wrench or pliers) may clamp down to rotate or constrain the rotation of second coupling member 14 relative to other components of hose assembly 10. In one embodiment, fixed fastening member 25 may have six equal planar sides (i.e., a hexagon). It is also contemplated that fixed fastening member 25 may be omitted or replaced with a knurled surface or otherwise roughened surface, if desired.

Second end 24 of second coupling member 14 may mechanically interface with the fluid system component. For example, second end 24 may have external threads (not shown) that may be received by internal threads (not shown) on the fluid system component. It is considered that second end 24 may alternatively interface with the fluid system component via a bolted flange connection, a welded connection, or any other connection known in the art. Second end 24 may also be integral with the fluid system component. It is contemplated that second end 24 may include a crimping element similar to crimping element 29, such that two flexible hoses 17 may be joined via first coupling member 12 and second coupling member 14, if desired.

Clamping ring 16 may secure first coupling member 12 to second coupling member 14 (i.e., control a relative axial separation between first coupling member 12 and second coupling member 14). Clamping ring 16 may include an internal shoulder 54 and a threaded portion 52. Threaded portion 52 may be received by externally threaded portion 50 of second coupling member 14. The outer surface of clamping ring 16 may be formed so as to allow interfacing with a tightening mechanism in a similar manner to fixed fastening member 25. It is also contemplated that the outer surface of clamping ring 16 may alternatively be knurled to allow for hand tightening, if desired. Clamping ring 16 may be fabricated from steel, aluminum, brass, plastic, composite, or any other material used or known in the art.

INDUSTRIAL APPLICABILITY

The disclosed hose assembly may be implemented in any fluid transmission system where undesired loosening of couplings may be a consideration. Specifically, the disclosed hose assembly may contain anti-rotational elements to constrain the rotation of a first coupling member relative to a second coupling member. This rotational constraint may prevent loosening of the coupling members and subsequent leakage of fluid from the interface between the coupling members.

To prevent leakage, first and second anti-rotational elements 26 and 28 may be interlocked by rotating and thus tightening clamping ring 16. Either hand or mechanical tightening (e.g., via a wrench or pliers) may be used. For example, threaded portion 50 may be threadingly received by externally threaded portion 52, thus causing internal shoulder 54 to abut external coupling shoulder 48. Further threading of threaded portion 52 relative to externally threaded portion 50 may force first anti-rotational element 26 to intermesh and interlock with second anti-rotational element 28 and may compress sealing member 30 against face 40. After first and second anti-rotational elements 26 and 28 are interlocked, rotation of first coupling member 12 relative to second coupling member 14 may be inhibited. Clamping ring 16 may constrain the axial translation of first coupling member 12 relative to second coupling member 14.

Several advantages of the disclosed hose assembly may be realized. In particular, the first coupling member of the disclosed hose assembly may accept a flexible hose via a crimping element, which may constrain the rotation and translation of the flexible hose relative to the first coupling member. Because only one non-rotationally constrained threaded connection may exist in the disclosed hose assembly (i.e., in the case of a threaded connection between the second coupling member and the fluid system component) the potential for loosening and leakage of the hose assembly joints may be significantly reduced. Furthermore, when a flange or welded connection is used between the second coupling member and the fluid system component or where the second coupling member is integral with the fluid system component, loosening may be eliminated. The constraint of rotation and translation of the disclosed flexible hose may be important for high pressure systems where the disclosed anti-rotational elements may prevent loosening caused by pressure induced changes in the trajectory of the hose (e.g., straightening).

It will be apparent to those skilled in the art that various modifications and variations can be made to the disclosed hose assembly. Other embodiments will be apparent to those skilled in the art from consideration of the specification and practice of the disclosed hose assembly. For example, the disclosed first coupling member and/or second coupling member may embody a tee member, a tee-swivel member, an elbow member, or any other related member known in the art. It is intended that the specification and examples be considered as exemplary only, with a true scope being indicated by the following claims and their equivalents.

What is claimed is:

1. A fluid coupling, comprising:
a coupling end for mechanically and fluidly joining the fluid coupling to another fluid coupling, the coupling end having a face;
a fluid orifice disposed on the face, the fluid orifice defining a central axis;
a plurality of ridges disposed around the fluid orifice in the face of the coupling end, wherein each of the plurality of ridges has a longitudinal dimension, the longitudinal dimension of each of the plurality of ridges extending radially outward from the central axis, wherein peaks of the plurality of ridges are flush with the face; and
a sealing member at least partially inset in the face of the coupling end around the fluid orifice.

2. The fluid coupling of claim 1, wherein each ridge of the plurality of ridges has a substantially triangular cross-sectional shape when the cross-section is taken circumferentially about the central axis.

3. The fluid coupling of claim 1, wherein the plurality of ridges allow for multiple angular orientations of the fluid coupling relative to the another fluid coupling while inhibiting relative rotation between the fluid coupling and the another fluid coupling when the fluid coupling engages with the another fluid coupling.

4. The fluid coupling of claim 1, wherein the sealing member is located radially inward of the plurality of ridges.

5. The fluid coupling of claim 1, further including external threads for engagement with internal threads of the another fluid coupling.

6. A fluid coupling assembly, comprising:
a first coupling member including:
a first coupling end including a first face;
a body;
a neck located between the body and the first coupling end, the neck having a diameter that is smaller than a diameter of the first coupling end and the body;
a first fluid orifice disposed on the first face, the fluid orifice defining a central axis, the first fluid orifice leading to a first fluid passageway that passes through the first coupling end, neck, and body of the first coupling member;
a first plurality of ridges disposed on the first face of the first coupling end, wherein each of the first plurality of ridges has a longitudinal dimension, the longitudinal dimension of each of the first plurality of ridges extending radially outward from the central axis;
a sealing surface disposed on the first face of the first coupling end around the first fluid orifice; and
a clamping ring including internal threads connected to the first coupling member; and
a second coupling member including:
a second coupling end including a second face;
a second fluid orifice disposed on the second face;
a second plurality of ridges disposed on the second face of the second coupling end, wherein the second plurality of ridges are configured to mate with the first plurality of ridges;
a sealing member at least partially inset in the second face of the coupling end around the second fluid orifice such that a surface of the second face is located on a radially interior side of a radially inner edge of the sealing member and another surface of the second face is located on a radially exterior side of a radially outer edge of the sealing member; and
external threads configured to engage the internal threads to couple the first and second coupling members together, wherein the sealing member is compressed against the sealing surface upon coupling of the first and second coupling members.

7. The fluid coupling assembly of claim 6, wherein each ridge of the first plurality of ridges has a substantially triangular cross-sectional shape when the cross-section is taken circumferentially about the central axis.

8. The fluid coupling assembly of claim 6, wherein when traveling about the central axis in a circumferential direction at a constant radius, the first plurality of ridges define peaks and valleys, wherein the first and second plurality of ridges allow for multiple angular orientations of the first coupling member relative to the second coupling member while inhibiting relative rotation between the first coupling member and the second coupling member when the first plurality of ridges engage with the second plurality of ridges.

9. The fluid coupling assembly of claim 8, wherein the sealing member is located inward of the second plurality of ridges.

10. The fluid coupling assembly of claim 6, wherein the clamping ring is slidably disposed on the neck portion of the first coupling member.

11. The fluid coupling assembly of claim 6, wherein at least one of the first coupling member or the second coupling member includes a crimping portion.

12. The fluid coupling assembly of claim 11, wherein the crimping portion is connected to a flexible hose.

13. The fluid coupling assembly of claim 6, wherein peaks of the second plurality of ridges are flush with the second face.

14. A fluid coupling assembly, comprising:
a first coupling member including:
a first coupling end including a first face;
a body;
a neck located between the body and the first coupling end, the neck having a diameter that is smaller than a diameter of the first coupling end and the body;
a first fluid orifice disposed on the first face, the first fluid orifice leading to a first fluid passageway that passes through the first coupling end, neck, and body of the first coupling member;
a first plurality of ridges disposed on the first face of the first coupling end;
a clamping ring including internal threads connected to the first coupling member, wherein a radially inner surface of the clamping ring is slidably disposed along an outer surface of the neck; and
a second coupling member including:
a second coupling end including a second face;
a second fluid orifice disposed on the second face defining a central axis;
a second plurality of ridges disposed on the second face of the second coupling end, wherein each of the second plurality of ridges has a longitudinal dimension, the longitudinal dimension of each of the second plurality of ridges extending radially outward from the central axis, wherein peaks of the second plurality of ridges are flush with the second face, the first plurality of ridges being configured to mate with the second plurality of ridges to inhibit rotation of the first coupling member relative the second coupling member when the first plurality of ridges engage with the second plurality of ridges; and
a threaded portion having external threads configured to engage the internal threads to couple the first and second coupling members together.

15. The fluid coupling assembly of claim 14, wherein at least one of the first coupling member or the second coupling member includes a crimping portion.

16. The fluid coupling assembly of claim 14, wherein the first coupling end, the body, and the neck of the first coupling member are integral components.

17. The fluid coupling assembly of claim 14, wherein the second coupling member further includes a sealing member at least partially inset in the second face of the coupling end around the second fluid orifice such that a surface of the second face is located on a radially interior side of a radially inner edge of the sealing member and another surface of the second face is located on a radially exterior side of a radially outer edge of the sealing member.

18. The fluid coupling assembly of claim 17, wherein the second coupling member further includes a fastening member fixedly coupled to the second coupling member, wherein a diameter of the fastening member is greater than a diameter of the threaded potion of the second coupling member.

* * * * *